Oct. 24, 1944.  E. B. STURGES  2,361,135

UNIVERSAL JOINT

Filed Oct. 30, 1941  2 Sheets-Sheet 1

INVENTOR
EDWARD B. STURGES
BY
M. W. McConkey
ATTORNEY

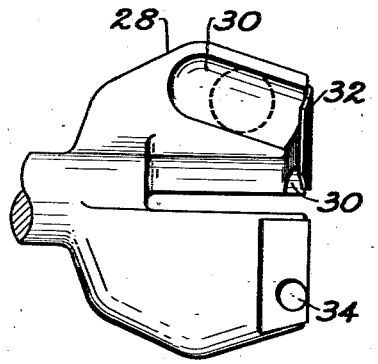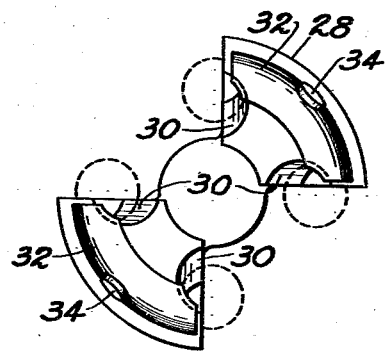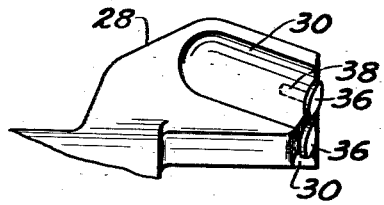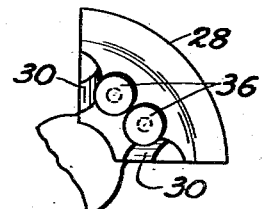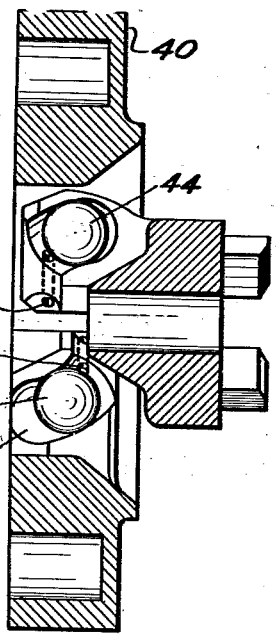

Patented Oct. 24, 1944

2,361,135

UNITED STATES PATENT OFFICE 2,361,135

UNIVERSAL JOINT

Edward B. Sturges, South Bend, Ind., assignor to Bendix Aviation Corporation, South Bend, Ind., a corporation of Delaware Application October 30, 1941, Serial No. 417,059

8 Claims. (Cl. 64—9)

This invention relates to universal joints, and more particularly to improvements therein for holding a universal joint in assembled position.

In certain types of universal joints, particularly of the constant angular velocity type, it has been necessary to employ an auxiliary shell partially surrounding the body members of the joint to prevent the joint from becoming disassembled. The use of an auxiliary shell partly surrounding the body members of the joint renders it necessary to machine the generally spherical outer surfaces of the joint members to minimize friction. When the auxiliary shell is employed to hold the joint in assembled relation, it is, of course, impossible to disassemble the joint without removing or, in some cases, destroying the auxiliary shell.

An object of this invention is to provide a novel construction for holding the joint in assembled relationship.

A further object is to provide a universal joint which may be manufactured more economically than similar joints have been manufactured heretofore.

Another object is to provide a construction which will make unnecessary a costly machining operation on the outer spherical surfaces of the joint.

Still another object is to provide a novel construction which will prevent the torque transmitting members from dropping out of position when the joint is removed from the particular device to which it is applied.

Still other objects and advantages of this invention will be apparent from a consideration of the following detailed description, considered in connection with the accompanying drawings, submitted for purposes of illustration only, and not intended to define the scope of the invention, reference being had for that purpose to the subjoined claims.

In the drawings:

Figure 6 shows in elevation a yoke member of a universal joint which employs straight races and shows another construction embodying a part of this invention;

Figure 7 is an end view of Figure 6 and shows a manner in which the race obstruction may be attached to the yoke member;

Figure 8 shows a half elevation of a yoke member employing straight races and shows another form of construction embodied in this invention;

Figure 9 is an end view of Figure 8; and

Figure 10 shows in section a circular driving member of a wobble type mechanism incorporating the type of construction shown in Figure 2 for obstructing the ball races of the universal joint mounted therein.

Figure 1:
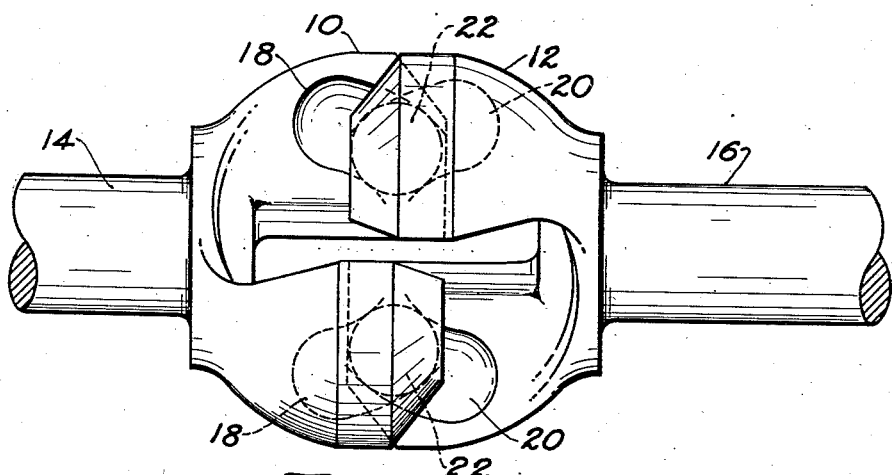
Figure 1 represents in elevation a universal joint assembly.

Referring more particularly to Figure 1, there is shown for purposes of illustration a universal joint of the constant angular velocity type having body members 10 and 12 integrally connected respectively to driving shaft 14 and driven shaft 16. Raceways 18 located in body member 10 and raceways 20 located in body member 12 are adapted to receive members 22, shown in dotted outline, therebetween to transmit torque between body member 10 and body member 12, and to roll in the raceways 18 and 20 and to bisect the angle between the shafts 14 and 16.

It will be observed that in the illustrated embodiment the raceways 18 and 20 are curved and inclined radially, so that their axes intersect at an angle, in the manner disclosed in C. W. Weiss Patent No. 1,522,351 issued January 6, 1925. In this type of joint, if the body members 10 and 12 are moved axially away from each other a sufficient distance the members move radially inwardly towards the intersection of the prolongation of the axes of the shafts 14 and 16 to a position where they may freely roll out of the outer ends of their raceways, thus disassembling the joint. To prevent the occurrence of this event when the joint assembly is being shipped or handled in connection with installation or removal from a vehicle or other use, a construction will be described which will obstruct the races and prevent the members from falling therefrom.

Figure 2:
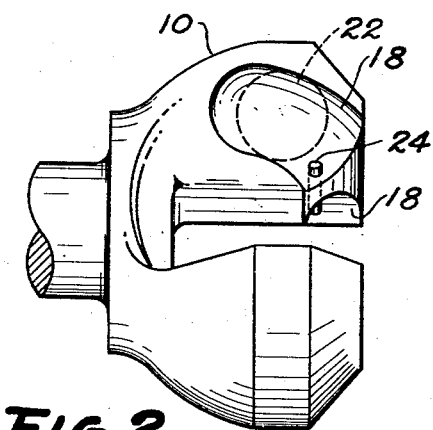
Figure 2 represents in elevation one of the yoke members of a universal joint showing a construction which forms a part of this invention.
Figure 3:
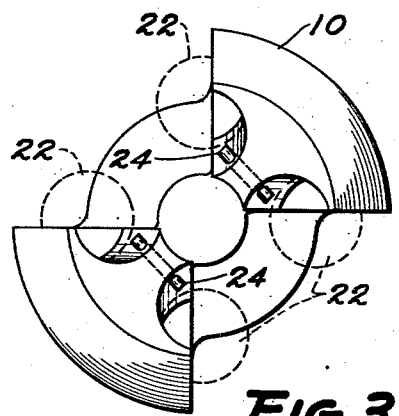
Figure 3 is an end view showing the same type of construction for a race obstruction forming a part of this invention.

Referring to Figures 2 and 3, there is shown a body member 10 having raceways 18 with torque transmitting members 22, shown in dotted outline, located therein. Near the juncture of raceway 18 and the end of body member 10 is located a pin 24, forming a race obstruction, and having ends protruding into each raceway 18, and suitably secured to the body member 10. The body member which cooperates with body member 10, corresponding to body member 12 in Figure 1, may carry an identical construction, but it is necessary to provide only one of the body members with an obstruction to prevent the torque transmitting members from dropping from the ends of the raceways.

Figures 4, 5:
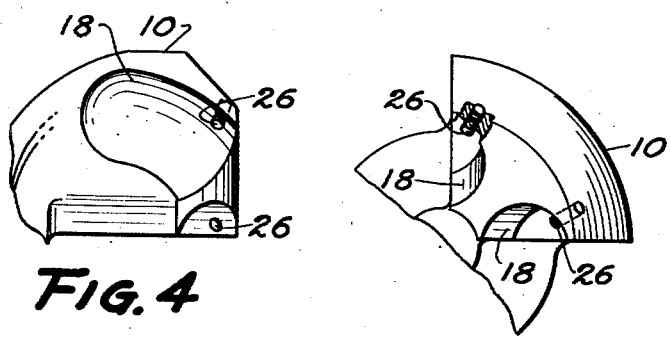
Figure 4 is a half elevation showing another form of construction for a race obstruction.
Figure 5 is an end view of Figure 4, a part thereof being cut away to show a possible method of securing the race obstruction.

Referring to Figures 4 and 5, there is shown a body member 10 having raceways 18, and pins 26, forming race obstructions, located near the end of the raceways 18 and near the end of body member 10. The race obstructions 26 may be of a suitable material and may be secured into a recess provided in the body member 10 either by driving or tapping and threading. The body member cooperating with body member 10 may carry the same construction for a race obstruction as body member 10, but it is necessary to provide only one of the body members with a race obstruction to accomplish the function described above.

In Figures 6 and 7 the body member 28 is shown with straight raceways 30 and is shown with a lug 32 which is fitted over each half body member, and which is secured thereto by a bolt or screw 34, or in some other manner. The body member cooperating with body member 28 may be provided with the same construction, but it is necessary to provide only one of the body members with a race obstruction to accomplish the purpose described above.

In Figures 8 and 9 there is shown the same type body member 28 having raceways 30. The ends of the raceways 30 are obstructed by buttons or caps 36 or the like secured to the shanks 38 which are driven or fitted into suitable recesses in the body member 28, and the body member cooperating with body member 28 may be provided with an identical construction.

In Figure 10 a circular driving member 40, forming a part of a wobble-type mechanism, is shown having a joint of the constant angular velocity type containing races 42 carrying therein torque transmitting members 44. Pins 46 forming obstructions in the races 42 prevent the disassembly of the joint when removed from the mechanism.

Referring once more to the figures, an assembly of a joint containing the novel devices forming a part of my invention operates as follows:

Axial endwise movement tending to separate the body members 10 and 12 will cause the torque transmitting members to move radially towards the intersection of the prolongations of the axes of the shafts 14 and 16. Continued axial movement will cause the torque transmitting members to reach a point where they will no longer be retained by the races 22. However, a joint incorporating the race obstructions described above, and embodying the several forms shown will not be subject to the undesirable features above mentioned.

From the above description it will be seen that there has been provided a novel construction which will permit a joint to operate with or without rolling end motion and yet will prevent the torque transmitting members from reaching a critical position where they will cease to perform their function. There has also been provided a novel and simple construction which is easy of manufacture, and which will make unnecessary a housing around the joint to limit the amount of endwise motion, a construction which is costly of manufacture, since it requires extensive machining operations.

There has also been described a novel arrangement which will permit of handling when the joint is removed from the vehicle or use in which it forms a part. The construction described will also insure against disassembly during shipping or at any other time.

While this invention has been described with particular reference to desirable embodiments thereof, it is not intended to limit the scope of the invention to the embodiments illustrated and described, nor otherwise than by the terms of the appended claims.

I claim:

1. In a driving member for a wobble-type mechanism, a universal joint having a pair of cooperating members having spaced interengaging arms, races located in the proximate faces of said arms, torque transmitting members received partly in said races, the races being so constructed and arranged that axial movement of the members away from each other causes the torque transmitting members to move radially to a position where they are no longer retained by said races, a pair of pins disposed one each in said arms and having portions extending into said races for preventing the torque transmitting members from reaching said position and to keep the joint in assembled relationship.

2. In a universal joint, a pair of cooperating body members having spaced interengaging arms with their proximate faces formed with non-concentric races having their longitudinal axes intersecting at an angle, torque transmitting members received partly in said races, the races being so constructed and arranged that axial movement of the body members away from each other causes the torque transmitting members to move radially to a position where they are no longer retained by said races, a pin secured near the end of each one of said arms and having portions extending into both races on each arm for preventing the torque transmitting members from reaching said position and to keep the joint in assembled relationship.

3. In a universal joint, a pair of cooperating body members having spaced interengaging arms with their proximate faces formed with non-concentric races having their longitudinal axes intersecting at an angle, torque transmitting members received partly in said races, the races being so constructed and arranged that axial movement of the body members away from each other causes the torque transmitting members to move radially to a position where they are no longer retained by said races, a pin secured near the end of each arm of one of said body members and having portions extending into both races on each arm for preventing the torque transmitting members from reaching said position and to keep the joint in assembled relationship.

4. In a universal joint, a pair of cooperating body members having spaced interengaging arms with their proximate faces formed with non-concentric races having their longitudinal axes intersecting at an angle, torque transmitting members received partly in said races, the races being so constructed and arranged that axial movement of the body members away from each other causes the torque transmitting members to move radially to a position where they are no longer retained by said races, a pair of pins secured to each arm of said body members, each pin having a portion extending into a race on said arm for preventing the torque transmitting members from reaching said position and to keep the joint in assembled relationship.

5. In a universal joint, a pair of cooperating body members having spaced interengaging arms with their proximate faces formed with non-concentric races having their longitudinal axes intersecting at an angle, torque transmitting members received partly in said races, the races being so constructed and arranged that axial movement of the body members away from each other causes the torque transmitting members to move radially to a position where they are no longer retained by said races, a pair of pins secured to each arm of one of said body members, each pin having a portion extending into one of the races on said arm for preventing the torque transmitting members from reaching said position and to keep the joint in assembled relationship.

6. In a universal joint, a pair of cooperating body members having spaced interengaging arms with their proximate faces formed with non-concentric races having their longitudinal axes intersecting at an angle, torque transmitting members received partly in said races, the races being so constructed and arranged that axial movement of the body members away from each other causes the torque transmitting members to move radially to a position where they are no longer retained by said races, a pair of pins secured to each arm near the end thereof, each pin having a portion extending into the race adjacent said pin for preventing the torque transmitting members from reaching said portion and to keep the joint in assembled relationship.

7. In a universal joint, a pair of cooperating body members having spaced interengaging arms with their proximate faces formed with non-concentric races having their longitudinal axes intersecting at an angle, torque transmitting members received partly in said races, the races being so constructed and arranged that axial movement of the body members away from each other causes the torque transmitting members to move radially to a position where they are no longer retained by said races, a pair of pins secured to each arm near the end thereof of one of said body members, each pin having a portion extending into the race adjacent said pin for preventing the torque transmitting members from reaching said position, and to keep the joint in assembled relationship.

8. In a universal joint, a pair of cooperating body members having spaced interengaging arms with their proximate faces formed with non-concentric races having their longitudinal axes intersecting at an angle, torque transmitting members received partly in said races, the races being so constructed and arranged that axial movement of the body members away from each other causes the torque transmitting members to move radially to a position where they are no longer retained by said races, at least a pair of pins secured to said body members and each pin having a portion protruding into the race of one of each pair of cooperating races for preventing the torque transmitting members from reaching said position and to keep the joint in assembled relationship.

EDWARD B. STURGES.